United States Patent [19]

Hon

[11] Patent Number: 5,509,768
[45] Date of Patent: Apr. 23, 1996

[54] SCREW RETAINING STRAP FOR SCREWING GUN DEVICE

[76] Inventor: Mau-Song Hon, 58, Ma Yuan West St., Taichung, Taiwan

[21] Appl. No.: 443,736

[22] Filed: May 18, 1995

[51] Int. Cl.⁶ .............................. F16B 15/08; B65D 85/24
[52] U.S. Cl. ........................ 411/442; 411/444; 411/966; 206/347
[58] Field of Search ............................ 411/442, 443, 411/444, 908, 966; 206/345, 346, 347

[56] References Cited

U.S. PATENT DOCUMENTS

| | | | |
|---|---|---|---|
| 2,385,777 | 10/1945 | Ebert | 206/347 X |
| 3,904,032 | 9/1975 | Maier | 411/442 X |
| 3,944,068 | 3/1976 | Maier et al. | 411/442 X |
| 4,018,334 | 4/1977 | Lejdegard | 206/347 X |
| 4,955,476 | 9/1990 | Nakata et al. | 206/347 X |
| 5,092,460 | 3/1992 | Satoh et al. | 206/347 |

*Primary Examiner*—Neill R. Wilson

[57] ABSTRACT

A strap supports a number of screws for supplying the screws into a screwing gun device. The strap include a number of holes for engaging with the screws and includes a number of resilient blades for retaining the screws in place. The strap includes a number of notches of different depth formed in the two side edges so as to allow bending of the strap from the one side edge toward the other side edge and so as to prevent the strap from affecting the operation of the screwing gun device.

1 Claim, 2 Drawing Sheets

SCREW RETAINING STRAP FOR SCREWING GUN DEVICE

BACKGROUND OF THE INVENTION

1. Field of the Invention

The present invention relates to a screwing gun device, and more particularly to a strap for retaining screws and for supplying the screws into the screwing gun device.

2. Description of the Prior Art

Typical screwing gun devices comprise a strap for retaining a number of screws thereon and for supplying the screws into the screwing gun device so as to be screwed into objects for fastening purposes. However, the screws may not be easily disengaged from the typical straps and the typical straps can not be easily bent such that the straps may affect the operation of the screwing gun device.

The present invention has arisen to mitigate and/or obviate the afore-described disadvantages of the conventional screwing gun devices.

SUMMARY OF THE INVENTION

The primary objective of the present invention is to provide a strap for supporting a number of screws and for supplying the screws into a screwing gun device, in which the screws may be easily disengaged from the straps and in which the straps may be bent in order not to affect the operation of the screwing gun device.

In accordance with one aspect of the invention, there is provided a strap for supporting a plurality of screws thereon and for supplying the screws into a screwing gun device for screwing purposes. The strap comprises a strap body including a plurality of holes formed therein for engaging with the screws and including a plurality of slits formed around the holes so as to define a plurality of resilient blades for retaining the screws in place, the strap body including a first side edge having a plurality of first notches formed therein and including a second side edge having a plurality of second notches formed therein, the first notches including a depth smaller than that of the second notches so as to allow bending of the strap from the second side edge toward the first side edge and so as to prevent the strap from affecting the operation of the screwing gun device.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
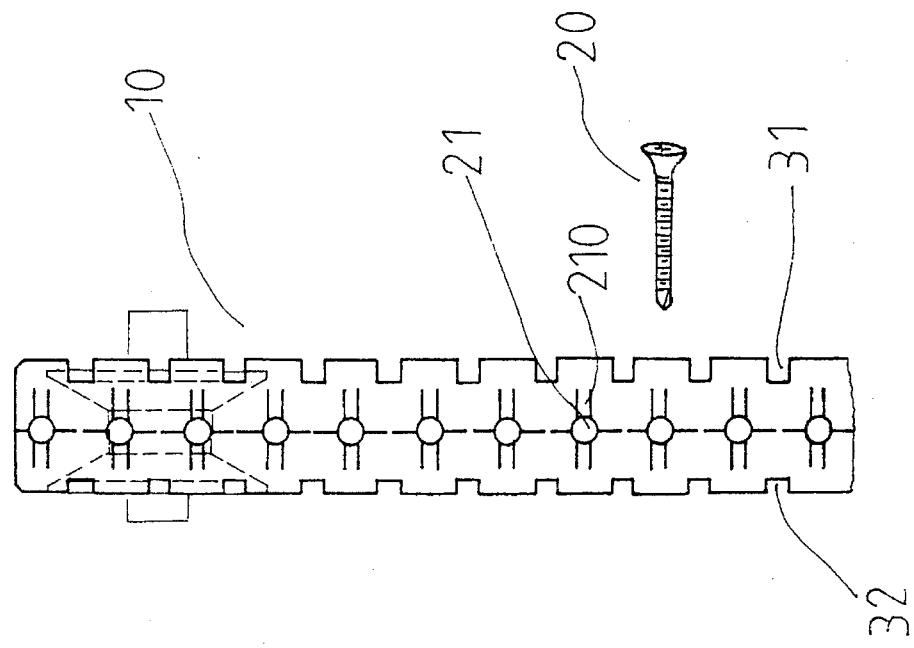
FIG. 1 is a plane view of a screwing gun device in accordance with the present invention.
Figure 2:
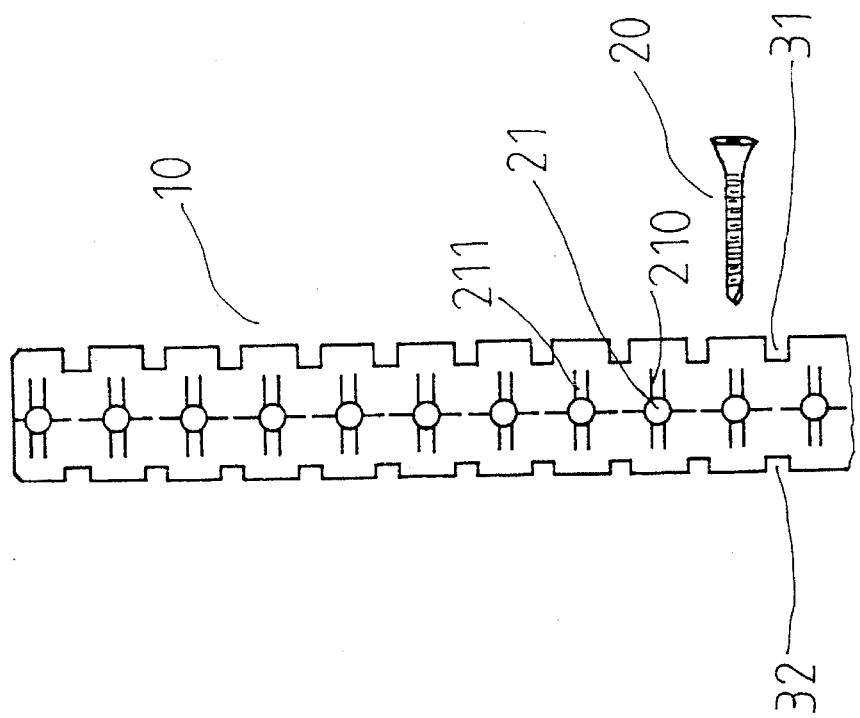
FIG. 2 is a plane view similar to FIG. 1, illustrating the engagement of the strap with a roller means.
Figure 3:
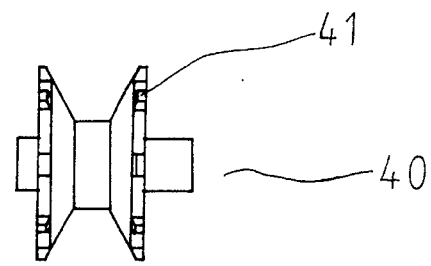
FIG. 3 is a plane view of a roller means.

Referring to the drawings, and initially to FIGS. 1 to 3, a strap in accordance with the present invention is provided for supporting a number of screws thereon and for supplying the screws into a screwing gun device for screwing purposes. The strap 10 in accordance with the present invention comprises a number of holes 20 formed therein for engaging with a number of screws 20 and comprises a number of slits 210 formed around the holes 20 and extended radially outward of the holes 20 so as to form a plurality of resilient blades 211 for resiliently clamping the screws 20 in place, such that the screws 20 may also be easily disengaged from the strap 10. The strap 10 includes two side edges each having a number pairs of notches 31, 32 formed therein for engaging with the teeth 41 formed on the outer peripheral portion of a roller means 40 such that the strap 10 may be moved and driven by the roller means 40. It is to be noted that the notches 31 includes a depth greater than that of the other notches 32, best shown in FIGS. 1 and 2.

Figure 4:
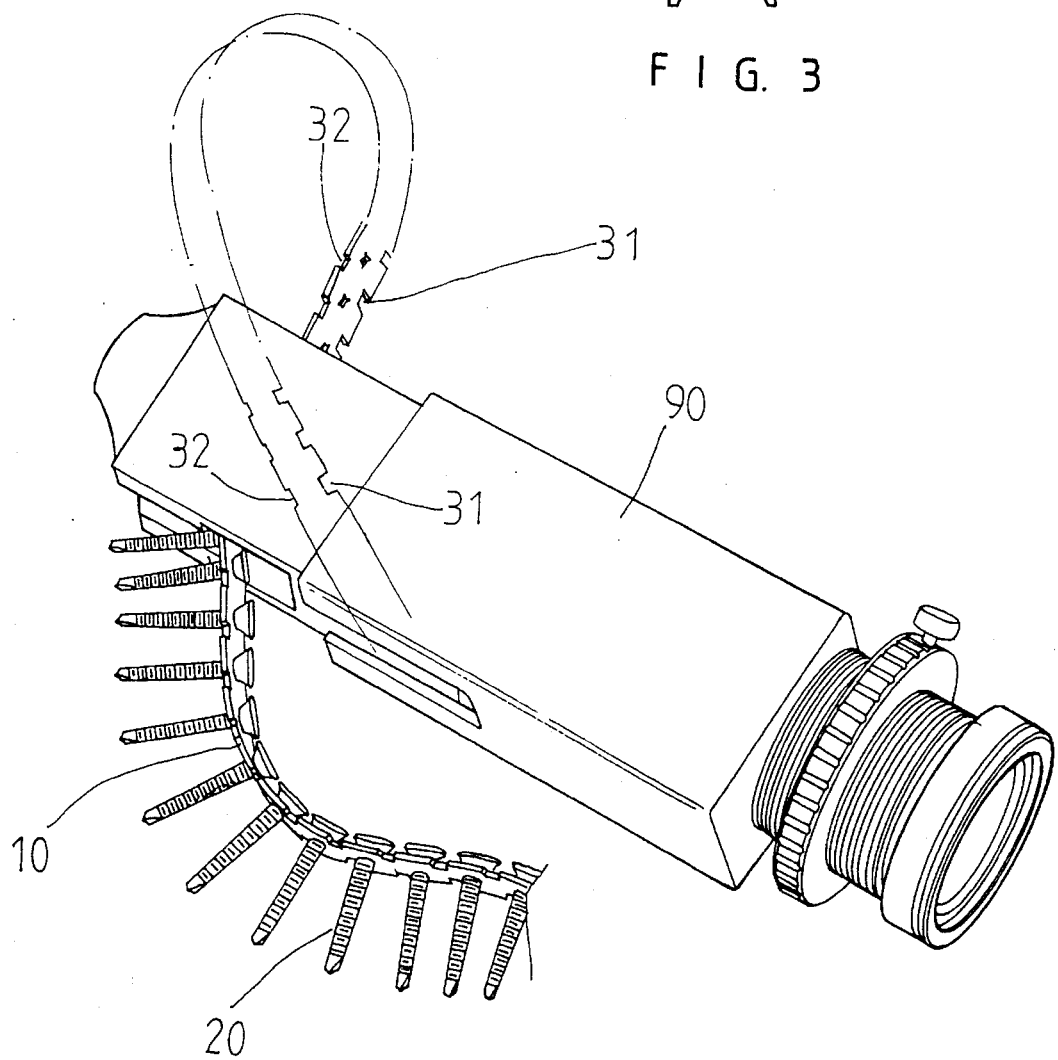
FIG. 4 is a perspective view illustrating the operation of the screwing gun device.

Referring next to FIG. 4, in operation, when the strap 10 is engaged in a screwing gun device 90, the side edge of the strap 10 having the deeper notches 31 formed therein may be easily stretched and may be easily bent toward the other side edge having the shallower notches 32 formed therein, such that the strap 10 may be bent in order to disengage from the screw driving means of the screwing gun device 90.

Accordingly, the strap in accordance with the present invention will not affect the screwing operation of the screwing gun device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A strap for supporting a plurality of screws thereon and for supplying the screws into a screwing gun device for screwing purposes, said strap comprising:

a strap body including a plurality of holes formed therein for engaging with said screws and including a plurality of slits formed around said holes so as to define a plurality of resilient blades for retaining said screws in place, said strap body including a first side edge having a plurality of first notches formed therein and including a second side edge having a plurality of second notches formed therein, said first notches including a depth smaller than that of said second notches so as to allow bending of said strap from said second side edge toward said first side edge and so as to prevent said strap from affecting the operation of the screwing gun device.

* * * * *